Jan. 25, 1955  A. C. JACKSON  2,700,505
HOUSE HEATING UNIT AND AUTOMATIC CONTROL THEREFOR
Filed April 16, 1952  5 Sheets-Sheet 1

Fig. I.

INVENTOR
Alonzo C. Jackson
BY
C. F. Bryant
ATTORNEY

Jan. 25, 1955      A. C. JACKSON      2,700,505
HOUSE HEATING UNIT AND AUTOMATIC CONTROL THEREFOR
Filed April 16, 1952      5 Sheets-Sheet 2
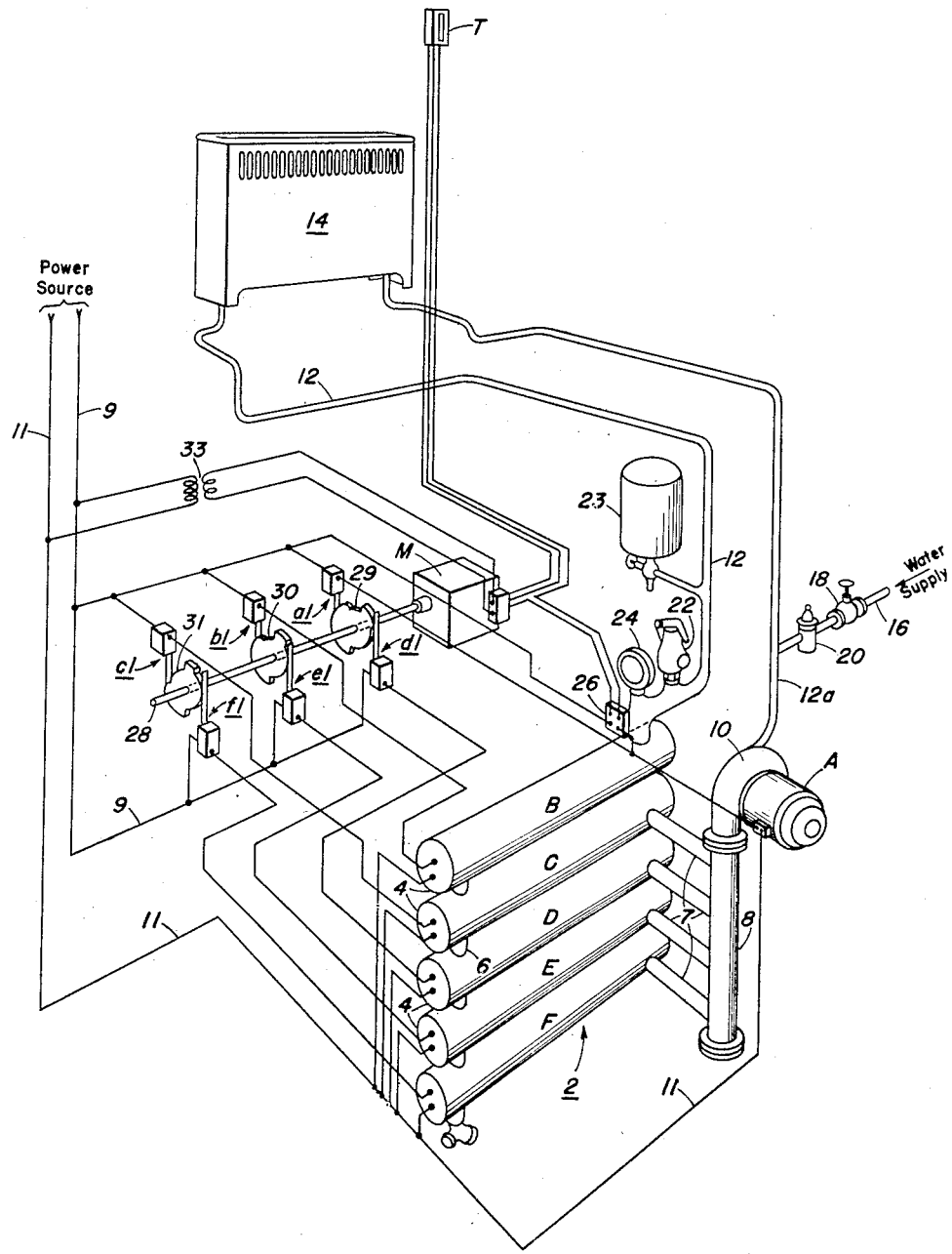
Fig. 2.
INVENTOR
Alonzo C. Jackson
BY
ATTORNEY Jan. 25, 1955          A. C. JACKSON                    2,700,505
               HOUSE HEATING UNIT AND AUTOMATIC CONTROL THEREFOR
Filed April 16, 1952                                5 Sheets-Sheet 4
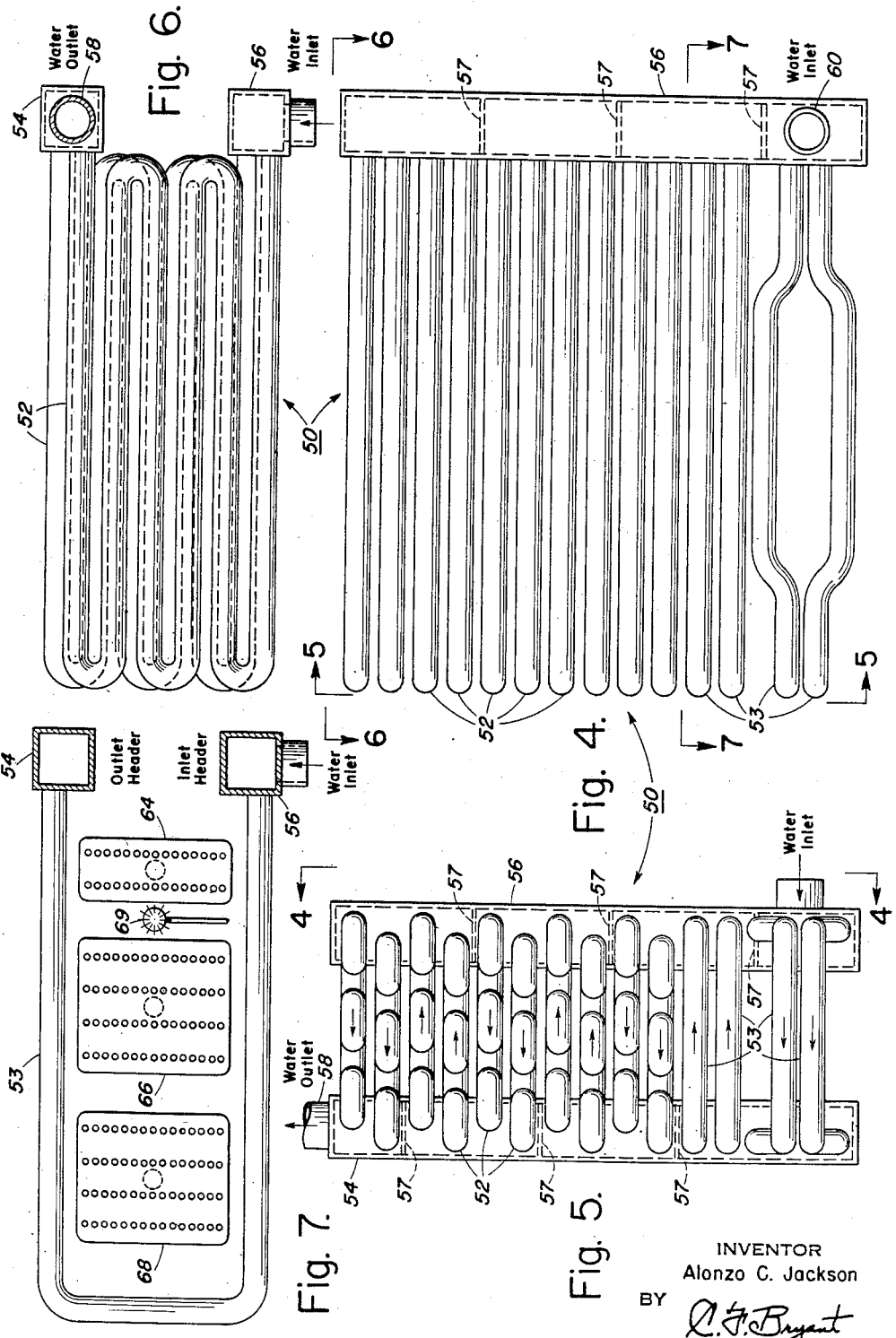
INVENTOR
Alonzo C. Jackson
BY
C. F. Bryant
ATTORNEY Jan. 25, 1955 A. C. JACKSON 2,700,505
HOUSE HEATING UNIT AND AUTOMATIC CONTROL THEREFOR
Filed April 16, 1952 5 Sheets-Sheet 5

INVENTOR
Alonzo C. Jackson
BY
C. F. Bryant
ATTORNEY

United States Patent Office

2,700,505
Patented Jan. 25, 1955

2,700,505

HOUSE HEATING UNIT AND AUTOMATIC CONTROL THEREFOR

Alonzo C. Jackson, Chattanooga, Tenn., assignor to Combustion Engineering, Inc., New York, N. Y., a corporation of Delaware Application April 16, 1952, Serial No. 282,651

6 Claims. (Cl. 236—9)

My invention relates generally to house heating units of the hot water type and it has special reference to such a unit employing control means to regulate the temperature of the water in accordance with the demand for heat from said unit.

Conventional domestic hot water heating units employing an Aquastat to maintain a fixed water temperature in the boiler and a room thermostat to effect an "on-off" control of a circulating pump typically result in intermittent heating of the radiators dispersed throughout the house and consequently cause the temperature within said house to fluctuate above and below the desired value to an extent that is in part dependent upon the sensitivity of the room thermostat and in part dependent upon the "over shoot" and "under-shoot" inherent in such an "on-off" controlled system due to the inertia thereof.

My improved heating unit, by way of contrast, novelly employs a controlled heat flow principle wherein the water is continuously circulated through the radiator (or other heat exchanger) of the heating system and the temperature of said water is regulated so that the output of the system substantially equals the heat loss of the house at the desired temperature. With this new type of unit the undesirable intermittent heating of the heat exchangers (together with the "over-shooting" and "under-shooting" of the desired temperature) is eliminated and a substantially constant room temperature is maintained.

Broadly stated, the object of my invention is to provide a controlled heat flow hot water heating unit for homes or the like that is extremely compact, has a minimum of parts, is highly efficient in operation, and can be quickly and easily substituted for presently existing conventional heating units.

A more specific obejct is to provide a controlled heat flow hot water heating unit for homes or the like with a plurality of heating means for varying the heat output of said system as desired.

A further object is to provide a controlled heat flow hot water heating unit for homes or the like with control means effective to regulate the heat input of said unit in such a manner that said input substantially equals the heat loss of the building being heated.

A still further object is to provide a controlled heat flow hot water heating unit for homes or the like with safety means responsive to the temperature (and/or pressure) within said unit and effective when said temperature (or pressure) exceeds a predetermined value to withdraw the application of heat to said unit while continuing the circulation of water through the heating system.

An additional object is to provide a controlled heat flow hot water heating unit for homes or the like having three burners controlled in such unique manner as to give five heat input steps that vary from minimum to maximum in substantially equal increments.

Still other objects and advantages will become apparent as the disclosure and description hereof proceeds.

My invention will be understood from the following detailed description of two illustrative embodiments thereof when read in conjunction with the accompanying drawings wherein:

Figure 2 is an isometric view of the Fig. 1 heating system disclosing a particular switch arrangement useable therein.

Figure 4 is an enlarged side view (from line 4—4 of Fig. 5) of the water heating tube assemblage employed in the gas-fired system of Fig. 3.

Figure 5 is an end view of said assemblage (from line 5—5 of Fig. 4) showing the baffle and tube arrangement utilized thereby.

Figure 6 is a top view, from line 6—6 of Figs. 3 and 4, of the same assemblage showing the shape of the water heating tubes in the assemblage's upper portion.

Figure 7 is a sectional view taken along line 7—7 of Figs. 3 and 4 showing the shape of the tubes in the lower section of said assemblage and also indicating how the three gas burners are nested therein.

The illustrated electrical heating system

Figure 1:
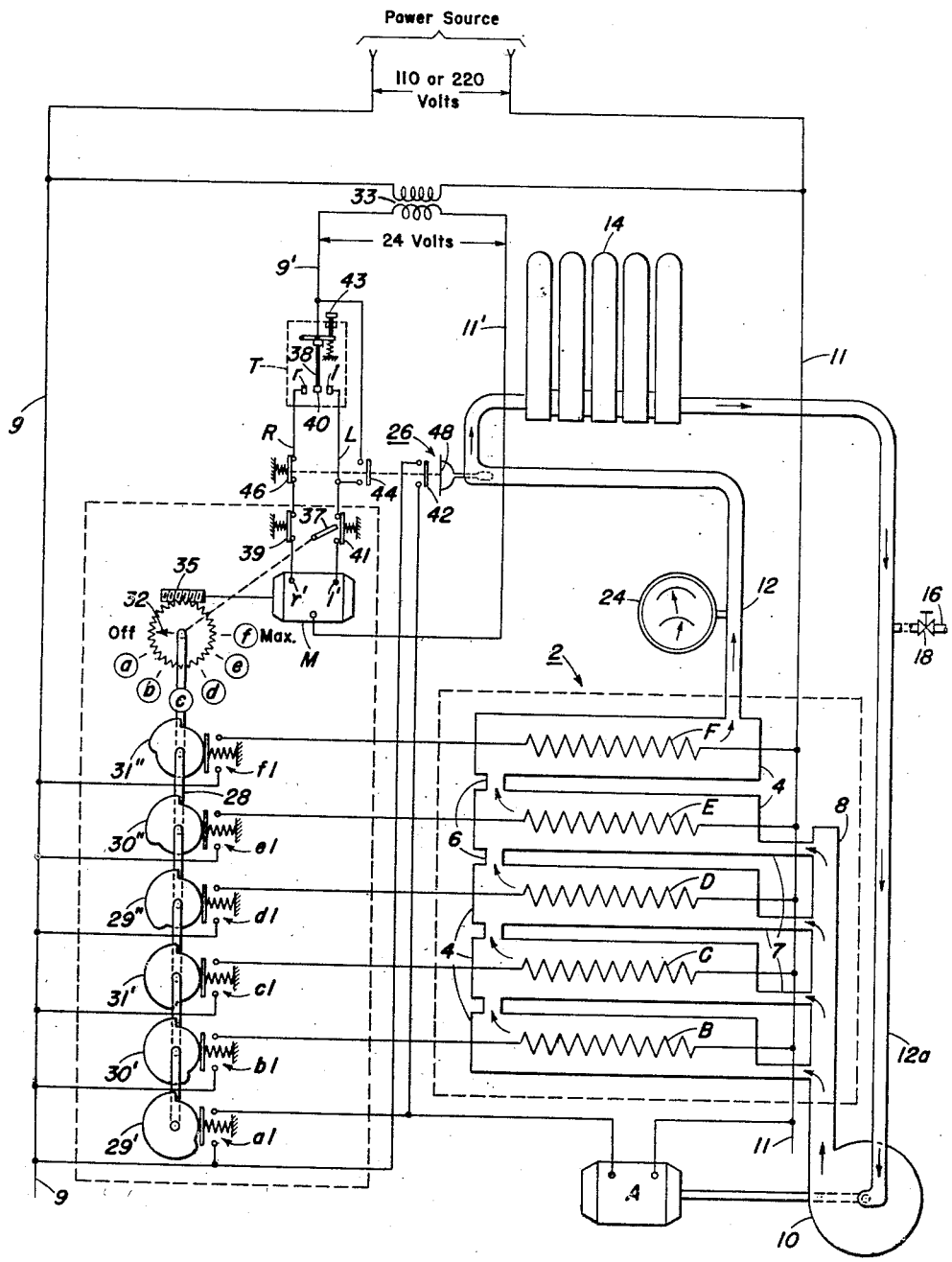
Figure 1 is a diagrammatic view of a heating system organized in accordance with my invention to utilize electrical heating elements and cooperating devices.

Looking first at Figs. 1 and 2, I have there shown a preferred embodiment of my electrical heating unit and system wherein a boiler, generally designated 2, comprises five horizontally disposed containers or tanks 4 here represented as being vertically aligned and interconnected at the forward ends through the medium of conduits 6. Each of these containers 4 is provided with an electrical heating element, preferably of the resistance type, positioned therein and respectively designated on the drawing as B, C, D, E, and F. Electrical switches $b1$, $c1$, $d1$, $e1$ and $f1$ selectively connect corresponding heating elements across electrical supply conductors 9 and 11, between which conductors it will be assumed that there is maintained an energizing potential of commercial voltage (such as 110 or 220 volts) and frequency (such as 25 or 60 cycles).

Inlet header 8 is connected to the rearward end of all but the uppermost of said containers 4 by conduits 7; and said header 8 is arranged to receive the discharge from a water circulating pump 10 that is driven by an electric motor A connectable via switch $a1$ across energizing conductors 9 and 11. Distribution conduit 12, having one or more radiators or other heat exchangers 14 (only one of which is shown on the drawings) disposed therein, is connected at one end to the rear of the uppermost tank 4 and at the other end 12a to the inlet of pump 10.

Connected intermediate the ends of said distribution conduit 12 is supply pipe 16 having a manually operable shut off valve 18 and a pressure regulator 20 (see Fig. 2) disposed therein for controlling the supply of water to the heating system. Also connected to said conduit is relief valve 22 (see Fig. 2) for relieving the pressure within the system when it exceeds a predetermined value, gauge 24 for indicating the temperature and pressure of the water within said system, and safety switch 26 (the purpose of which will be explained later) operated either by the temperature of the water within said system and/or by the pressure of said water. A conventional expansion tank likewise may communicate with distribution conduit 12 as shown at 23 in Fig. 2.

From as much of the system as has been thus far described it will be seen that the system is filled with water through pipe 16, valve 18 and regulator 20, and thereafter circulation of said water is maintained by pump 10 which forces the water through header 8 into the rear of all but the uppermost tank 4 via conduits 7, out the front of all but said uppermost tank via conduits 6, and out of the rear of the uppermost tank into conduit 12 which returns said water to said pump 10. Said water confined within the system and circulated as aforesaid may satisfactorily be maintained under a pressure of about 25 pounds per square inch gauge; and at such pressure the water can be heated up to nearly 270° F. without converting any of the water into steam.

*The control for the electrical system*

My heating unit is controlled in such manner that the heat input thereto is at all times kept substantially equal to the heat loss from the building being heated by said unit; and to achieve this objective I make use of a modulated type of control which cuts in or cuts out such of the heating elements as are required to give the necessary input.

In Figs. 1 and 2 I have diagrammatically illustrated one form of such control wherein a series of cam actuated switches $a1$, $b1$, $c1$, $d1$, $e1$ and $f1$ are respectively positioned in circuits serving different elements A, B, C, D, E and F, and are effective to control the energization and deenergization of said circuits. Suitable cams for actuating said switches are positioned on rotatable shaft 28 in such manner that rotation of said shaft counterclockwise from the "Off" position, as depicted in Fig. 1 (where all of said switches are open) to the "Maximum" position, wherein indicator 32 is adjacent indicia $f$, progressively closes said switches in the order named, while opposite or clockwise rotation of said shaft 28 from the "Maximum" position to the "Off" position progressively opens said switches in inverse order of their closing.

In the aforementioned counterclockwise rotation (still referring to Fig. 1), when indicator 32 of shaft 28 is opposite indicia $a$ only switch $a1$ is closed; when opposite indicia $b$ switches $a1$ and $b1$ are closed; when opposite $c$ switches $a1$, $b1$ and $c1$ are closed; when opposite $d$ switches $a1$, $b1$, $c1$ and $d1$ are closed; when opposite $e$ switches $a1$, $b1$, $c1$, $d1$ and $e1$ are closed; and when opposite $f$, as previously stated, all of said switches are closed. Thus counterclockwise rotation of shaft 28 effects progressive energization of elements A to F and thereby raises the heat input to boiler 2; while clockwise rotation effects progressive deenergization of said elements and thereby lowers the heat input to boiler 2.

The aforesaid rotations of shaft 28 are effected by a reversible motor M. In the arrangement represented said motor M is connected to shaft 28 through gearing 35 (see Fig. 1) or the like and is controlled by suitable temperature responsive apparatus here illustratively shown as comprising a thermostat T. The details of said temperature responsive control apparatus may take any one of a number of possible different forms and any mechanism will suffice which is capable of giving a modulated control of motor M in accordance with the heat demand of the building being heated whereby said motor will move in a direction and to an amount corresponding to the particular heat requirement. One control system that has proved satisfactory is a Minneapolis-Honeywell Series 90 thermostat (corresponding to device T hereof) used in conjunction with a series 90 Modutrol motor (corresponding to device M hereof) and an associated Wheatstone bridge circuit.

In the simplified control system here disclosed by way of illustration, motor M receives suitable energizing potential (such as 24 volts) from the secondary conductors 9' and 11' of transformer 33, whose primary winding is bridged across the main supply conductors 9 and 11. When the temperature of the heated space falls too low, thermostat T closes contacts 40 and $r$ and energizes motor terminal $r'$ over circuit R, thereby causing the motor to drive switch shaft 28 in the counterclockwise or heat-input raising direction; likewise, when the temperature of the heated space goes too high thermostat T closes contacts 40 and $l$ and energizes motor terminal $1'$ over circuit L, thereby causing motor M to drive cam shaft 28 in the clockwise or heat-input-lowering direction.

Calibration of the illustrated thermostat T is adjusted by turning a top screw 43; and for each setting of said screw there exists a temperature at which floating contact 40 is disengaged from both contacts $r$ and $l$. As the temperature of the heated space falls below that predetermined value, the bimetal strip 538 brings contacts 40 and $r$ together; and as the temperature rises above that predetermined value said bimetal strip 38 brings contacts 40 and $l$ together. In this way too low a temperature in the heated space (surrounding thermostat T) causes energization of motor M over circuit R with accompanying rotation of shaft 28 in the counterclockwise or heat-input-raising direction; while too high a temperature in the heated space causes energization of motor M over circuit L with accompanying rotation of shaft 28 in the clockwise or heat-input-lowering direction.

In order to prevent motor M from advancing shaft 28 too far in either the heat-raising (counterclockwise in Fig. 1) or the heat-lowering (clockwise in Fig. 1) direction, use may be made of normally-closed switches 39 and 41 respectively inserted in the "raise" and the "lower" supply leads R and L, as per the diagram of Fig. 1. These switches 39 and 41 are conventional, and they may be actuated in any suitable way (as via member 37 of Fig. 1) which causes them to selectively open when switch cam shaft 28 approaches the extremes in its range of adjustment positioning.

In this improved electrical heating unit the resistor heating elements B—C—D—E—F may be disposed in their containers 4 either as shown diagrammatically in Fig. 1 or in the rearranged order depicted by Fig. 2 (element B at the top and element F at the bottom); each of these five elements may have a power input rating of about 5000 watts (or higher or lower depending upon specific requirements of the house to be heated) thereby giving a total input of approximately 25 kilowatts when control switches $a1$—$b1$—$c1$—$d1$—$e1$—$f1$ are all closed; and these six switches may satisfactorily be organized for actuation by only the three cams represented at 29, 30 and 31 in Fig. 2.

From the drawings it will be seen that the composite cam 29 of Fig. 2 carries on opposite sides of its mounting shaft 28 lobes which correspond to 29' and 29" of Fig. 1 and which respectively serve switches $a1$ and $d1$; that the composite cam 30 of Fig. 2 carries on opposite sides of shaft 28 lobes corresponding to 30' and 30" of Fig. 1 and respectively serving switches $b1$ and $e1$; and that the composite cam 31 of Fig. 2 carries on opposite sides of shaft 28 lobes which correspond to 31' and 31" of Fig. 1 and which respectively serve switches $c1$ and $f1$.

These three composite cams 29—30—31 may if desired be positioned closely adjacent one another on shaft 28, and the two sets of switches $a1$—$b1$—$c1$ and $d1$—$e1$—$f1$ may also be positioned adjacent one another in close spacing corresponding to that of cams 29—30—31. This compacted arrangement (not shown in Fig. 1) permits the three named cams to be formed from a single piece of material which together with the cooperating sets of side-by-side positioned switches span only a relatively short length of shaft 28 and lends itself to incorporation into a unitary assemblage that occupies a minimum of space and that is characterized by low first cost, long operating life, high durability and ease of maintenance.

Figure 3:
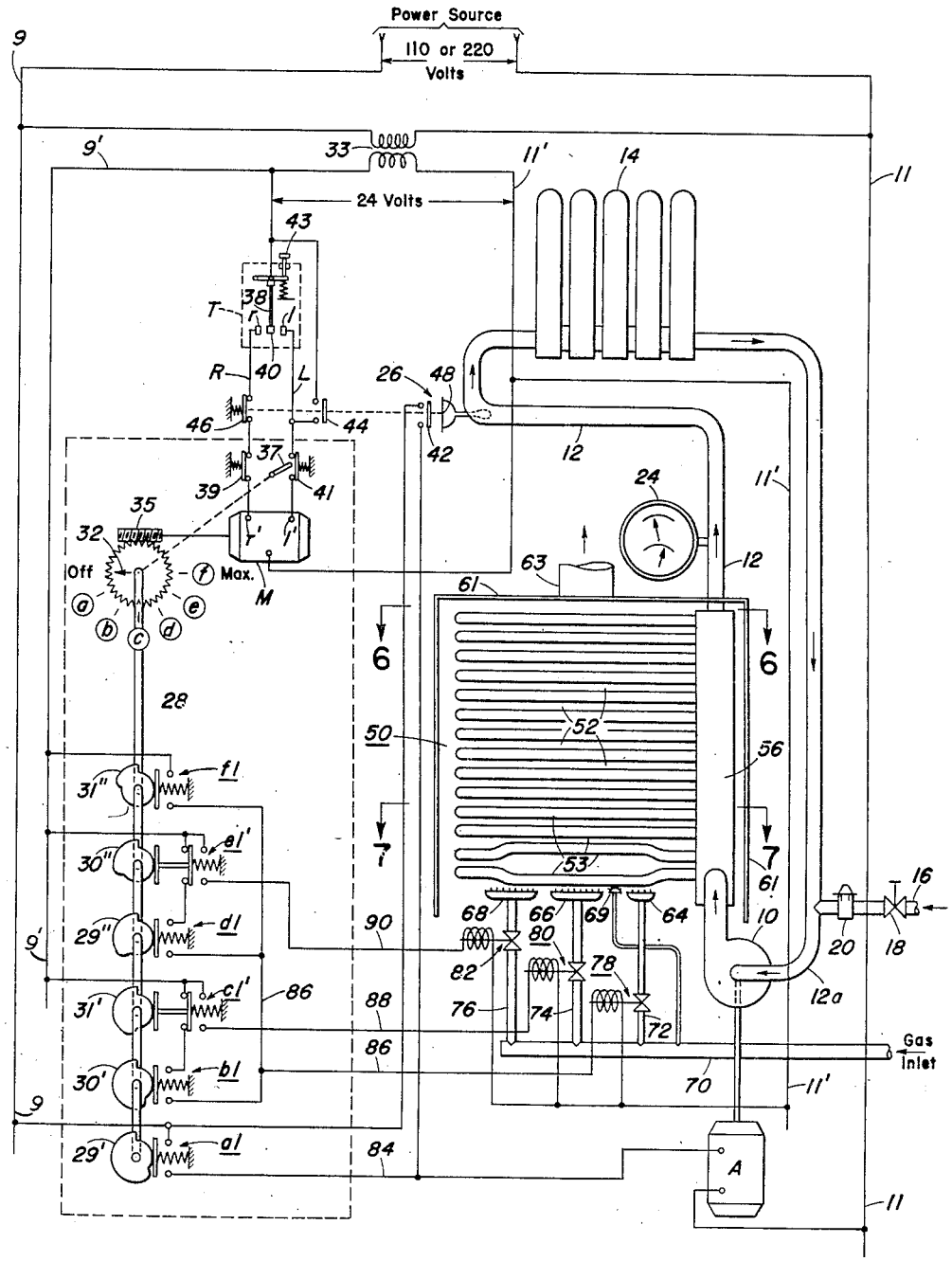
Figure 3 is a diagrammatic view of a modified form of heating system organized in accordance with my invention to utilize gas burner heating elements and cooperating devices.

Further included in the new house heating system here disclosed is a safety switch shown at 26 in Figs. 1 and 2 (and also Fig. 3). This switch 26 responds to excessive temperature (and/or pressure) of the water from boiler 2 in distribution conduit 12, and upon each such response it serves to cut off all heat input to the boiler while continuing the circulating pump 10 in operation. In the illustrative form here shown, said safety switch 26 utilizes a gang of three contacts 42, 44 and 46 operatively connected to element 48 which is responsive to the temperature (and/or pressure) within said system; contacts 42 and 44 being normally open and contact 46 being normally closed. In the illustrative system shown regulator 20 may be set to keep the system water within a normal pressure range of from 12 to 15 p. s. i. gauge, relief valve 22 may be set to open upon abnormal rise in the system pressure to from 25 to 30 p. s. i. gauge, and safety switch 26 may be set to respond to some intermediate elevated pressure such as about 20 p. s. i. gauge.

Upon a rise in said system temperature above a predetermined value such as 240° F. (or upon a rise in said pressure above a predetermined value), element 48 of switch 26 moves all three contacts to the left in Fig. 1 thereby causing contact 42 to bypass switch $a1$ and continue pump motor A in operation even though switch $a1$ may later open, thereby also causing contact 44 to bypass "lower" contacts 40–1 of thermostat T and energize motor M over circuit L thus returning switch shaft 28 to the "off" position wherein all six switches $f1$ through $a1$ are open and thereby further opening contact 46 in the circuit R of motor M to prevent thermostat T from trying to run motor M in the "raise" direction.

Figure 8:
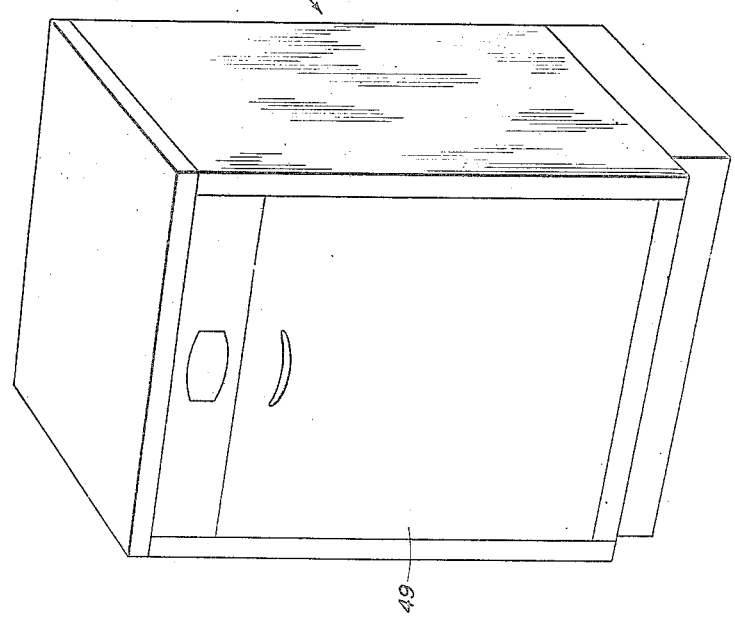
Figure 8 is an overall view showing how the electric heating unit of Figs. 1 and 2 appears after it has been assembled into an enclosing cabinet.

The just described electrical unit of Figs. 1 and 2 including the boiler 2, pump 10 (with motor A) and control mechanism is of such a size that it fits neatly within cabinet 47 of Fig. 8, which cabinet is approximately 33" x 24" x 24", and thus forms, as will be appreciated, an extremely compact heating unit. Removable cover 49 provided in the front of said cabinet 47, permits access to the elements within said cabinet.

Operation of the electrical unit

Assuming the building in which the radiator 14 (or other heater exchanger) and the thermostat T are placed is considerably below the desired temperature when the system of Figs. 1–2 is turned on contacts 40 and $r$ of thermostat T will energize motor M over circuit R causing counterclockwise rotation of shaft 28 and sequential closing of switches $a1$ to $f1$ inclusive; this in turn will effect first the energization of pump motor A and thereafter the energization of heating elements B, C, D, E and F in the order mentioned. The heating unit thus initially goes to full capacity and soon warms the water circulated through radiator 14 to an elevated temperature such as 175 or 200° F.

As the desired temperature is approached in the aforementioned building, thermostat T will deenergize circuit R; and once said desired temperature has been exceeded contacts 40 and $l$ will energize motor M over circuit R causing clockwise rotation of shaft 28 and consequent deenergization of certain of the heating elements in inverse order of their energization. This clockwise rotation of shaft 28 will be stopped by thermostat T when the number of heating elements remaining energized approximates, as closely as possible, the heat loss of the building.

Under this condition the temperature of the water continuously circulated through the heating system (as long as there is a demand for heat) will depend upon the heat loss of the room or building being heated; it varying from a few degrees above room temperature at a minimum heat loss condition up to the so-called "design" temperature of the system at maximum heat loss condition. Said "design" temperature will typically be about 200° F. for radiator or convector type systems (here shown), about 140 to 160° F. when the here illustrated radiators 14 are replaced by radiant ceiling panels, and about 120° F. when radiant floor panels are employed by the system. A system incorporating my improved control thus will continuously supply sufficient heat to maintain the aforesaid desired temperature within said building, and the average or mean temperature of the circulated water will be much lower than in conventional systems. Since the radiators or other heat exchangers in a system of this improved type remain at a rather even temperature, their efficiency of operation is noticeably increased and the temperature of the building being heated remains substantially constant without the usual variation of an on-off type of control.

Should the temperature or pressure within the heating system exceed a predetermined value, safety switch 26 will become effective to deenergize all of the heating elements but retain the circulating pump 10 in operation in order to maintain circulation within said system to reduce the temperature of the water therein. This result is brought about by the opening of contact 46 in circuit R and the closing of contact 44, causing motor M to drive shaft 28 in a clockwise direction whereby switches $f1$, $e1$, $d1$, $c1$, $b1$ and $a1$ are opened causing the circuits associated therewith to be deenergized. Simultaneous with the actuation of contacts 46 and 44, contact 42 is closed to short circuit switch $a1$ and continue energization of motor A notwithstanding movement of the latter switch to an open position.

Upon the temperature or pressure within the system returning to said predetermined value safety switch 26 will reclose contact 46 and reopen contacts 44 and 42 thereby returning said system to normal operation.

The illustrated gas heating system

The diagrammatic view of Fig. 3 illustrates a preferred embodiment of my gas fired unit which differs from the electric unit only in respect to the boiler, the means for heating said boiler, and the electrical circuit arrangement for controlling the heating means. Like elements in the two units bear like reference characters.

The gas unit boiler 50 comprises a series of upper horizontally disposed vertically aligned boiler tubes 52 (also shown in Figs. 4–5–6) and a series of horizontally disposed vertically aligned U-shaped furnace tubes 53 forming the lower section of the boiler tube bank. Each of said tubes is connected at one end to outlet header 54 and at the other end to inlet header 56 (see Figs. 4–5–6–7); and these two headers 54 and 56 may if desired be provided with a series of baffles 57 to direct the water flow through boiler 50 in a manner to obtain higher heat-transfer efficiency.

Distributing conduit 12 of this gas-fired heating unit is connected at one end to outlet 58 in header 54 and at the other end (12a) to inlet 60 in header 56 (through circulation pump 10); and, like the electrical system, the Fig. 3 heating unit is provided with combination temperature-pressure gauge 24, heat exchanger 14 illustratively shown in the form of a radiator, a connection to water supply pipe 16, and circulating pump 10 driven by electric motor A.

Gas burners 64, 66 and 68 disposed below boiler tube bank 50 receive their fuel supply through gas inlet conduit 70 and distribution conduits 72, 74 and 76, respectively; and a suitable pilot burner 69 assures ignition of the main burners when gas is admitted thereto. Electrically operated valves 78, 80 and 82 disposed in said conduits 72, 74 and 76, respectively, control the flow of fuel therethrough; each of these valves being normally closed and admitting gas (along with an appropriate quantity of air through conventional mixing means not shown) to its burner only when energizing current is supplied to the valve winding.

In the arrangement disclosed burner 64 has one half the capacity of each of the other two burners; i. e., when all three burners are operating burner 64 supplies 20% of the heat, burner 66 supplies 40%, and burner 68 supplies 40%. The total heat liberated is of course chosen to supply the maximum heat required of the system; and in one design the three burners 64—66—68 liberate heat at the rate of 150,000 B. t. u.'s per hour when all three are in operation.

Figure 9:
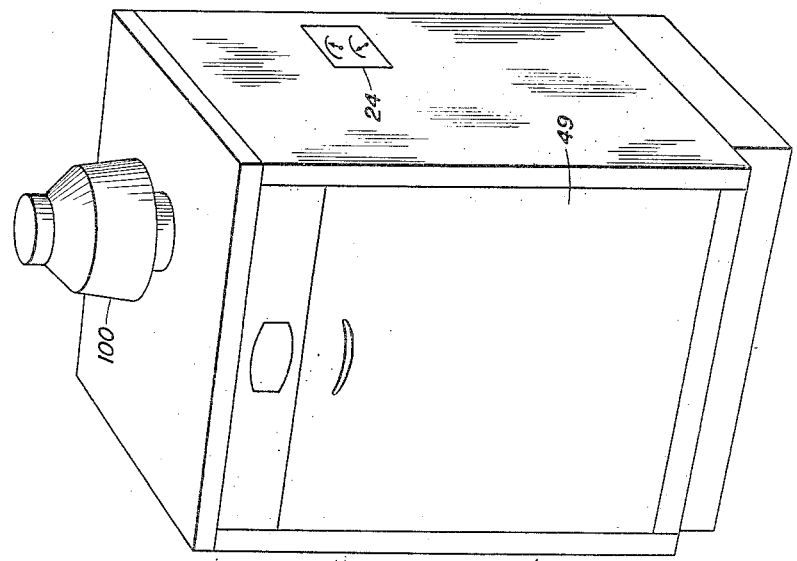
Fig. 9 is an overall view showing how the gas heating unit of Figs. 3–4–5–6–7 appears after it has been assembled into an enclosing cabinet.

The boiler assemblage 50 above these burners is surrounded by a casing 61 (shown only in Fig. 3) of suitable heat insulating material provided at its top with a vent 63 which communicates with the draft diverter 100 of the heating unit cabinet shown at 47' in Fig. 9.

The control of gas system

The control system for my gas unit as illustratively shown by Fig. 3 utilizes a number of electrical circuits disposed between supply lines 9' and 11' together with cam actuated switches $a1$—$b1$—$c1'$—$d1$—$e1'$—$f1$ to control the energization of pump motor A and burner valves 78—80—82. Said six switches may if desired be organized for actuation either by the six cams represented in Fig. 3 or by only three cams arranged in the manner depicted by Fig. 2.

Referring to the Fig. 3 circuits specifically, circuit 84 has pump motor A disposed therein and is controlled by switch $a1$ the same as in Figs. 1–2; circuit 86 has the solenoid of burner 64's control valve 78 disposed therein and is controlled by all five switches $b1$, $c1'$, $d1$, $e1'$ and $f1$; circuit 88 has the solenoid of burner 66's control valve 80 disposed therein and is controlled by switch $c1$; and circuit 90 has the solenoid of burner 68's control valve 82 disposed therein and is controlled by switch $e1'$. As already indicated, the aforesaid six switches of the Fig. 3 system are sequentially actuated in a manner similar to the corresponding switches in the electrical system; such actuation being accomplished by motor M through the medium of gearing 35, shaft 28 and the cams mounted thereon (arranged either as in Fig. 3 or as in Fig. 2) under the control of thermostat T.

Safety switch 26 is incorporated into the circuit arrangement of this Fig. 3 gas unit in exactly the same manner as the electrical unit of Figs. 1 and 2.

Cabinet 47' (Fig. 9) which houses my gas heating unit when completely assembled, is the same size as cabinet 47 employed with the electrical unit (33"x24"x24") and is provided with a removable front panel 49 and the draft diverter 100 earlier mentioned.

Operation of the gas unit

Starting from a cold building, as in the case of the electrical unit hereinbefore described, when the Fig. 3 system is turned on thermostat T will energize circuit R causing motor M to effect counterclockwise rotation of shaft 28 thereby sequentially actuating switches $a1$ to

*f*1, inclusive; this in turn will affect the various circuits in the following manner and in the order mentioned below.

Circuit 84 will first become energized; thereby starting pump motor A; circuit 86 will next become energized thereby bringing burner 64 (20% total rating) into action; circuit 86 will then become deenergized (shutting off burner 64) and circuit 88 will become energized thereby bringing burner 66 (40% total rating) into action; circuit 86 will once more become energized thereby again bringing burner 64 into action but this time in supplement to burner 66; circuit 86 will then become deenergized shutting off burner 64 and circuit 90 will become energized thereby bringing burner 68 (40% total rating) into action; and lastly circuit 86 will once more become energized thereby adding burner 64 to the two now operating burners 66 and 68.

It will thus be seen that as the switches are progressively actuated by counterclockwise rotation of shaft 28, motor A will first be energized; thereafter burner 64 (20%) will be activated, then burner 64 (20%) will be deactivated and burner 66 (40%) will be activated, next burner 64 (20%) will again be activated while burner 66 (40%) continues in operation, bringing total heat input to 60%; then burner 64 will be deactivated and burner 68 (40%) will be substituted therefor; and lastly burner 64 (20%) will once more be activated while burners 66 (40%) and 68 (40%) continue in operation, thereby bringing total heat input to 100%. In this way, since burner 64 is only half the capacity of each of burners 66 and 68, five heating steps of equal increments are provided with the use of but three gas burners 64, 66 and 68.

After the gas-fired heating system has been supplying one hundred percent of its capacity for a time, the temperature within said building will reach the desired temperature. As the building temperature further rises, thermostat T will (through motor M and circuit L) cause shaft 28 to rotate in a clockwise direction thereby decreasing the heat input of the system to a point determined by said thermostat T, where said input approximates, as closely as possible, the heat loss of the building. Under this condition the temperature of the water continuously circulating through the system will typically be only a few degrees higher than the desired room temperature, depending upon the heat loss at any particular time.

The function of safety switch 26 in the gas unit of Fig. 3 is the same as in the electric unit; said switch 26 being effective when a predetermined temperature or pressure within said system is exceeded, to cause rotation of shaft 28 in the counterclockwise direction until indicator 32 is in the "off" position and all the burners 64, 66, 68 are extinguished and also being effective to short circuit switch *a*1 whereby circulating pump 10 will remain in operation in order to lower the temperature of the water in the system. Upon the pressure or temperature within the system receding to said predetermined value, normal control of the system is resumed.

*Summary*

From the foregoing it will readily be seen that I have provided an improved domestic hot water heating system wherein the water is continuously circulated therethrough and the temperature of said water is regulated so that the heat given up by said system substantially equals the heat loss of the building within which said system is incorporated; that I have provided a heating unit the source of heat for which may be either electricity or a burnable fuel such as gas having a plurality of heat input steps whereby the input to said unit may be varied in predetermined increments; that I have provided a cam operated switch assemblage of compact design; that I have provided a control arrangement for a heating unit having only three burners whereby five heat input steps of equal increments may be had; and that I have provided a safety device that will withdraw the application of heat to the aforementioned system but continue the circulation of water therethrough when the temperature or pressure within said system exceeds a predetermined value.

While I have shown and described two preferred embodiments of my invention, it is to be understood that such embodiments are illustrative rather than restrictive and that variations and modifications may be made therein without departing from the spirit and scope of the invention. I therefore do not wish to be limited to the precise details set forth but desire to avail myself of such changes and alterations as fall within the purview of the following claims.

What I claim is:

1. In a hot water heating system the combination of a boiler, a heat exchanger connected to said boiler and disposed so as to heat a defined space, a pump for circulating water through said boiler and heat exchanger, said boiler having three burners two of which are of the same capacity with the other being one half the capacity of each of said two, means operative to independently activate and deactivate said burners, control means for said last mentioned means and including a motor means, said control means being constructed and arranged so that when said motor means moves in a predetermined direction the half capacity burner is first activated, then the half capacity burner is deactivated and one of the higher capacity burners is activated, then the half capacity burner is again activated, then the half capacity burner is deactivated and the other higher capacity burner is activated, and then finally the half capacity burner is again activated, said control means effecting an inverse operational procedure when the motor means moves in the direction opposite to said predetermined direction, and means responsive to the temperature in said defined space operative to regulate said control means for movement of said motor in a direction and to an amount corresponding to the particular heat requirement of said defined space whereby the activation of the burners is such that the heat input to the system approximates the heat loss for said defined space.

2. In a controlled heat flow hot water heating system, boiler means having an inlet and an outlet; heat exchanger means fluidly connected between said inlet and said outlet and being adapted to heat a defined space; means for circulating hot water through said boiler and heat exchanger means; a plurality of heat generating means associated with said boiler means for heating said water, control means for said circulating means and said heat generating means including individual electrical circuits for governing activation of each of said heat generating means and of said circulating means; switch means positioned in each of said circuits for controlling the energization of said circuits and accordingly the activation of said heat generating means and of said circulating means; rotary cam means for operating said switches effective when moved in one direction to progressively close said switches, closing the switch for the circulating means at least as soon as the first of the switches for the heat generating means is closed and when moved in the opposite direction to progressively open said switches; motor means operatively connected to said cam means; control means for said motor means including a thermostat responsive to the temperature in said defined space, said control means being constructed and arranged to position the cam in a manner to give a continuous heat input to the boiler approximating as near as possible the heat loss from the space being heated when the temperature of said space is at its control point, and means responsive to the temperature of the water within said system operable when said temperature exceeds a predetermined maximum to energize said motor means for movement of said cam means to a position where said switches are open with accompanying deactivation of all of said heat generating means and then also effective to short circuit the switch for said circulating means with accompanying continuance of the circulating means in operation.

3. In a heating system which utilizes a boiler, a heat exchanger connected to said boiler for heating a defined space, a pump for circulating a heat exchange medium from said boiler through said heat exchanger, the combination of three burners for heating the heat exchange medium in said boiler, one of said burners having substantially half the capacity of each of the other two higher capacity burners; electrically operated valves for controlling the activation and deactivation of said three burners; control means for said burner valves and for said pump comprising a first electrical circuit which activates said pump when energized and deactivates the pump when deenergized, a second electrical circuit for controlling the valve that governs activation of said half capacity burner, a third electrical circuit for controlling the valve that governs activation of the first of said higher capacity burners, and a fourth electrical circuit for controlling the valve that governs activation of the second of said higher capacity burners, each of said last three circuits activating its controlled burner when energized and deactivating the burner when deenergized; switch mechanism associated with said circuits to control the energization thereof, said mechanism including cam means constructed and arranged when moved in one direction to first energize said first circuit bringing said pump into operation and thereafter progressively energize said second circuit, to activate said half capacity burner, next substantially simultaneously deenergize said second circuit and energize said third circuit to substitute said first higher capacity burner for said half capacity burner, then once more energize said second circuit to add said half capacity burner to said one higher capacity burner, thereafter substantially simultaneously deenergize said second circuit and energize said fourth circuit to substitute said second higher capacity burner for said half capacity burner and lastly energize said second circuit again to add said half capacity burner to said first and second higher capacity burners, said cam means affecting said circuits inversely when moved in a direction opposite to said one direction; a reversible motor operatively connected to said switch mechanism to impart said one-direction and said opposite-direction movements to said cam means; and control means for said motor having means responsive to the temperature in said defined space, said control means being operative to effect rotation of said motor which moves said cam means in a direction and to an amount corresponding to the particular heat requirement of said defined space whereby the activation of the burners is such that the heat input to the system approximates the heat loss for said defined space.

4. In a heating system, the combination of a boiler; a heat exchanger connected to said boiler for heating a defined space; a pump for circulating a heat exchange medium from said boiler through said heat exchanger; three burners for heating the heat exchange medium in said boiler, one of said burners having substantially half the capacity of each of the other higher capacity burners; electrically operated valves for governing the activation of said three burners; a first electrical circuit for controlling activation of said pump; a second electrical circuit for controlling the valve that governs activation of said half capacity burner; a third electrical circuit for controlling the valve that governs activation of said first higher capacity burner; a fourth electrical circuit for controlling the valve that governs activation of said second higher capacity burner; switch mechanism governing the energization of said four circuits and including cam means constructed and arranged when moved in one direction to first act on said first circuit in a way that brings said pump into operation and thereafter progressively to act on said second circuit in a way which activates said half capacity burner, next to act on said second and third circuits in a way which substitutes said first higher capacity burner for the half capacity burner, then to act on said second circuit in a way which adds said half capacity burner to said first higher capacity burner, thereafter to act on said second and fourth circuits in a way which substitutes said second higher capacity burner for said half capacity burner, and lastly to act on said second circuit in a way which adds said half capacity burner to said first and second higher capacity burners, said cam means affecting said circuits inversely when moved in a direction opposite to said one direction; a reversible motor operatively connected to said switch mechanism to impart said one-direction and said other-direction movements to said cam means; and control means for said motor including thermostatic means responsive to the temperature in said defined space, said control means being operative to effect rotation of said motor which moves said cam means in a direction and to an amount corresponding to the particular heat requirement of said defined space whereby the activation of the burners is such that the heat input to the system approximates the heat loss for said defined space.

5. In a heating system which utilizes a boiler, a heat exchanger connected to said boiler for heating a defined space and means including a pump for circulating a heat exchange medium from said boiler through said heat exchanger, the combination of three burners for heating the heat exchange medium in said boiler, one of said burners having substantially half the capacity of each of the other two higher capacity burners; electrically operated valves for controlling the activation and deactivation of said three burners; a first electrical circuit for controlling activation of said pump; a second electrical circuit for controlling the valve that governs activation of said half capacity burner; a third electrical circuit for controlling the valve that governs activation of said first higher capacity burner; a fourth electrical circuit for controlling the valve that governs activation of said second of said higher capacity burner; switch mechanism governing the energization of said four circuits and including cam means constructed and arranged when moved in one direction to first act on said first circuit in a way that brings said pump into operation and thereafter progressively to act on said second circuit in a way which activates said half capacity burner, next to act on said second and third circuits in a way which substitutes said first higher capacity burner for the half capacity burner, then to act on said second circuit in a way which adds said half capacity burner to said first higher capacity burner, thereafter to act on said second and fourth circuits in a way which substitutes said second higher capacity burner for said half capacity burner, and lastly to act on said second circuit in a way which adds said half capacity burner to said first and second higher capacity burners, said cam means affecting said circuits inversely when moved in a direction opposite to said one direction; a reversible motor operatively connected to said switch mechanism to impart said one-direction and said opposite-direction movements to said cam means; control means for said motor having means responsive to the temperature in said defined space, said control means being operative to effect rotation of said motor which moves said cam means in a direction and to an amount corresponding to the particular heat requirement of said defined space whereby the activation of the burners is such that the heat input to the system approximates the heat loss for said defined space; and safety switch means effective when the temperature in said system exceeds a predetermined value to close a circuit to said reversible motor causing rotation thereof to a position where all of the aforesaid four circuits are deenergized, said safety switch means then further being effective to continue said pump in operation.

6. In a heating unit, the combination of three burners one of which has substantially half the capacity of each of the other two higher capacity burners; an electrically operated valve associated with each burner to control activation thereof; a pump for circulating heated fluid through said unit and an electric motor for driving said pump; control means for said burner valves and for said pump motor responsive to the temperature of a defined space that is arranged to be heated by said unit, said control means comprising a first electric circuit including said motor, a second electric circuit including the electrically operated valve for said half capacity burner, a third electric circuit including the electrically operated valve for the first of said higher capacity burners, a fourth electric circuit including the electrically operated valve for the second of said higher capacity burners; a first switch effective when in one position to break said first circuit and in a second position to complete said first circuit thereby activating said pump motor, a second switch effective when in one position to break said second circuit and in a second position to complete said second circuit thereby activating said half capacity burner, a third switch in series with said second switch and said third circuit effective when in one position to complete said second circuit and break said third circuit and in a second position to break said second circuit and complete said third circuit thereby activating said first higher capacity burner, a fourth switch in parallel with said second switch and effective in one position to break said second circuit and in a second position to complete said second circuit thereby activating said half capacity burner, a fifth switch in series with said fourth switch and said fourth circuit effective in one position to complete said second circuit and break said fourth circuit and in a second position to break said second circuit and complete said fourth circuit thereby activating said second higher capacity burner, a sixth switch in parallel with said second and fourth switches effective in one position to break said second circuit and in a second position to complete said second circuit thereby activating said half capacity burner; cam mechanism operable when moved in one direction to successively move said switches from said one to said second position in numerical order and to reverse the movement of said switches when the cam mechanism is moved in the opposite direction; a reversible motor operatively connected to said cam mechanism to impart said one-direction and said opposite-direction movements thereto; and control means for said reversible motor including means responsive to the temperature of said defined space, said control means being operable to energize said motor for rotation which moves said cam mechanism in a direction and to an amount corresponding to the heat requirements of said defined space, the so-produced movement of the cam mechanism by said reversible motor and the accompanying actuation of the switches being so correlated that the heat input to said system substantially equals the heat loss for said defined space.

References Cited in the file of this patent

UNITED STATES PATENTS

| | | |
|---|---|---|
| 1,664,229 | Staege | Mar. 27, 1928 |
| 1,743,621 | Quinn | Jan. 14, 1930 |
| 1,811,378 | Bannister | June 23, 1931 |
| 1,897,883 | Bienenstock | Feb. 14, 1933 |
| 2,073,676 | Broderick | Mar. 16, 1937 |
| 2,211,573 | McGrath | Aug. 13, 1940 |
| 2,275,317 | Ryder | Mar. 3, 1942 |

FOREIGN PATENTS

| | | |
|---|---|---|
| 727,159 | Germany | Nov. 4, 1942 |